(12) United States Patent
Riolo et al.

(10) Patent No.: US 10,539,588 B2
(45) Date of Patent: Jan. 21, 2020

(54) METHOD FOR REDUCING ERROR IN ROTOR SPEED MEASUREMENTS

(71) Applicant: GENERAL ELECTRIC COMPANY, Schenectady, NY (US)

(72) Inventors: Joseph Scott Riolo, Cincinnati, OH (US); David Allen Bradford, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/035,784

(22) PCT Filed: Nov. 7, 2014

(86) PCT No.: PCT/US2014/064521
§ 371 (c)(1),
(2) Date: May 11, 2016

(87) PCT Pub. No.: WO2015/069998
PCT Pub. Date: May 14, 2015

(65) Prior Publication Data
US 2016/0291052 A1    Oct. 6, 2016

Related U.S. Application Data

(60) Provisional application No. 61/902,474, filed on Nov. 11, 2013.

(51) Int. Cl.
*G01P 21/02* (2006.01)
*G01P 3/481* (2006.01)
(Continued)

(52) U.S. Cl.
CPC .............. *G01P 21/02* (2013.01); *G01P 3/489* (2013.01)

(58) Field of Classification Search
CPC .......... G01P 21/02; G01P 3/481; G01P 3/488; G01P 3/489
(Continued)

(56) References Cited

U.S. PATENT DOCUMENTS 4,127,812 A   11/1978   Baliguet
5,757,676 A   5/1998    Hobelsberger
(Continued)

FOREIGN PATENT DOCUMENTS

CN   101809417 A   8/2010
CN   102854334 A   1/2013
(Continued)

OTHER PUBLICATIONS

International Search Report and Written Opinion dated Feb. 25, 2015 which was issued in connection with PCT Patent Application No. PCT/US14/64521 which was filed on Nov. 7, 2014.
(Continued)

*Primary Examiner* — Justin Seo
*Assistant Examiner* — Rodney T Frank
(74) *Attorney, Agent, or Firm* — Dority & Manning, P.A.

(57) ABSTRACT

The method of reducing error in rotor speed measurement includes synchronously measuring a rotor having a target including at least one geometric imperfection. Time intervals for the passing of each tooth of a rotor are stored in a circular buffer memory array. Speed is always determined by extracting the time for a complete revolution, so that geometric imperfections and asymmetry of the rotating target do not influence the speed determination, which is always representing the average speed over the latest complete revolution.

19 Claims, 6 Drawing Sheets

(51) Int. Cl.
*G01P 3/489* (2006.01)
*G01P 3/488* (2006.01)

(58) Field of Classification Search
USPC .......................................................... 73/1.37
See application file for complete search history.

(56) References Cited

U.S. PATENT DOCUMENTS

| | | | |
|---|---|---|---|
| 6,037,765 | A | 3/2000 | Saeger et al. |
| 6,204,658 | B1 | 3/2001 | Stanusch et al. |
| 8,433,538 | B2 | 4/2013 | Holzmann et al. |
| 2007/0245746 | A1 | 10/2007 | Mollmann et al. |
| 2007/0250245 | A1 | 10/2007 | Van Der Merwe et al. |
| 2011/0116908 | A1 | 5/2011 | Thies |
| 2012/0041711 | A1 | 2/2012 | Jacoby et al. |
| 2014/0253105 | A1 | 9/2014 | Wiszniewski et al. |

FOREIGN PATENT DOCUMENTS

| | | |
|---|---|---|
| DE | 19536840 | 4/1997 |
| DE | 20111078041 A1 | 12/2012 |
| DE | 102011078041 A1 | 12/2012 |
| EP | 0849598 | 6/1998 |
| GB | 2059598 A | 4/1981 |

OTHER PUBLICATIONS

Machine translation and a Chinese Office Action issued in connection with corresponding CN Application No. 201480061762.0 dated May 2, 2018.
Canadian Office Action Corresponding to CA Application 2929831 PCTUS2014064521 dated Mar. 27, 2017.
Canadian Office Action Corresponding to CA Application 2929831 PCTUS2014064521 dated Feb. 13, 2018.
Second Chinese Office Action Corresponding to CN Application 201480061762 dated Jan. 3, 2019.

METHOD FOR REDUCING ERROR IN ROTOR SPEED MEASUREMENTS

CROSS-REFERENCE TO RELATED APPLICATIONS

This PCT application is a national stage application under 35 U.S.C. § 371(c) of prior filed, co-pending PCT application serial number PCT/US2014/064521, filed on Nov. 7, 2014, which claims priority to U.S. Patent Application Ser. No. 61/902,474, titled "Method for Reducing Error in Rotor Speed Measurements" filed Nov. 11, 2013. The above-listed applications are herein incorporated by reference.

BACKGROUND

Present embodiments relate generally to measuring systems for determining rotor speed. More particularly, but not by way of limitation, present embodiments relate to methods of reducing error in rotor speed measurements.

Rotor speed may be utilized to make various determinations in operating characteristics of many types of rotating structures. For example, brake assemblies, engines, turbines, propeller shafts, fans, conveyors or any other rotating structure. The term "rotor" should be understood as a broadly defined rotating mechanical structure. Rotor speed is typically indicated in revolutions per minute (RPM), radians per second or hertz.

Generally, two methods of determining rotor speed or RPM are utilized. A frequency measurement system is utilized for fast rotating devices such as motors and turbines that typically rotate in thousands of revolutions per minute. Alternatively, period measurement system is more commonly utilized for structures having shafts that rotate at lesser speeds.

Sensors are normally utilized to determine rotor speed and may be embodied by shaft encoders, rotary pulse generators, proximity sensors or photoelectric sensors. In conjunction with the sensor, a rotor may include a target with one or more features which are measured during rotation of the rotor. These targets may have unintended geometric imperfections or intentional geometric inconsistencies which correspond to a location or condition of the rotor, such as top dead center of the rotor. For example, some targets may have a rib, tooth or other projection which is sized, shaped or spaced differently than other features of the target. Accordingly, these geometric imperfections introduce error into the measuring process which may result in propagation of such error through subsequent calculations based on the measuring process.

Accordingly, it would be desirable to develop methods in order to provide a more accurate system of measuring in order to reduce errors associated with known methods of measuring rotor speed.

The information included in this Background section of the specification, including any references cited herein and any description or discussion thereof, is included for technical reference purposes only and is not to be regarded subject matter by which the scope of the instant embodiments are to be bound.

SUMMARY

Present embodiments of the method of reducing error in rotor speed measurement include synchronously measuring a rotor having a target which may include one or more geometric imperfections. A sensor is utilized to create a periodic waveform and used by a measuring system which will create an array of a preselected number of periods. When the preselected number of times is reached, new times are added and old times are removed from the array. An average speed is determined based on a subset of the array of periods. The average may be for the entire list or some portion of the list or some multiple corresponding to a multiple of complete revolutions.

According to some embodiments, a method of measuring rotor speed comprises positioning a sensor opposite a target, the target including a plurality of features, measuring a period corresponding to time between each of the plurality of features on the target passing the sensor, establishing an array of the periods, the array including up to a preselected number of the periods, removing old periods from the array when new periods are added and the preselected number of periods is reached, and, calculating an average period from a subset of the periods in the array, the average period corresponding to one of a complete revolution or a multiple of complete revolutions and, calculating rotational speed of a rotor from the average period.

According to some embodiments, a method of measuring rotor speed comprises positioning a sensor opposite a target, the target including a plurality of features wherein the features include at least one geometric imperfection, measuring a period corresponding to time between each of the plurality of features on the target passing the sensor, establishing an array of the periods, the array including up to a preselected number of the periods, removing old periods from the array when new periods are added and the preselected number of periods is reached, calculating an average period from a subset of the periods in the array, the average period corresponding to one of a complete revolution or a multiple of complete revolutions, and, calculating rotational speed of a rotor from the average period to compensate for the at least one geometric imperfection.

All of the above outlined features are to be understood as exemplary only and many more features and objectives of the method may be gleaned from the disclosure herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this disclosure, and the manner of attaining them, will become more apparent and the method of reducing error will be better understood by reference to the following description of embodiments taken in conjunction with the accompanying drawings, wherein.

DETAILED DESCRIPTION

Figure 1:
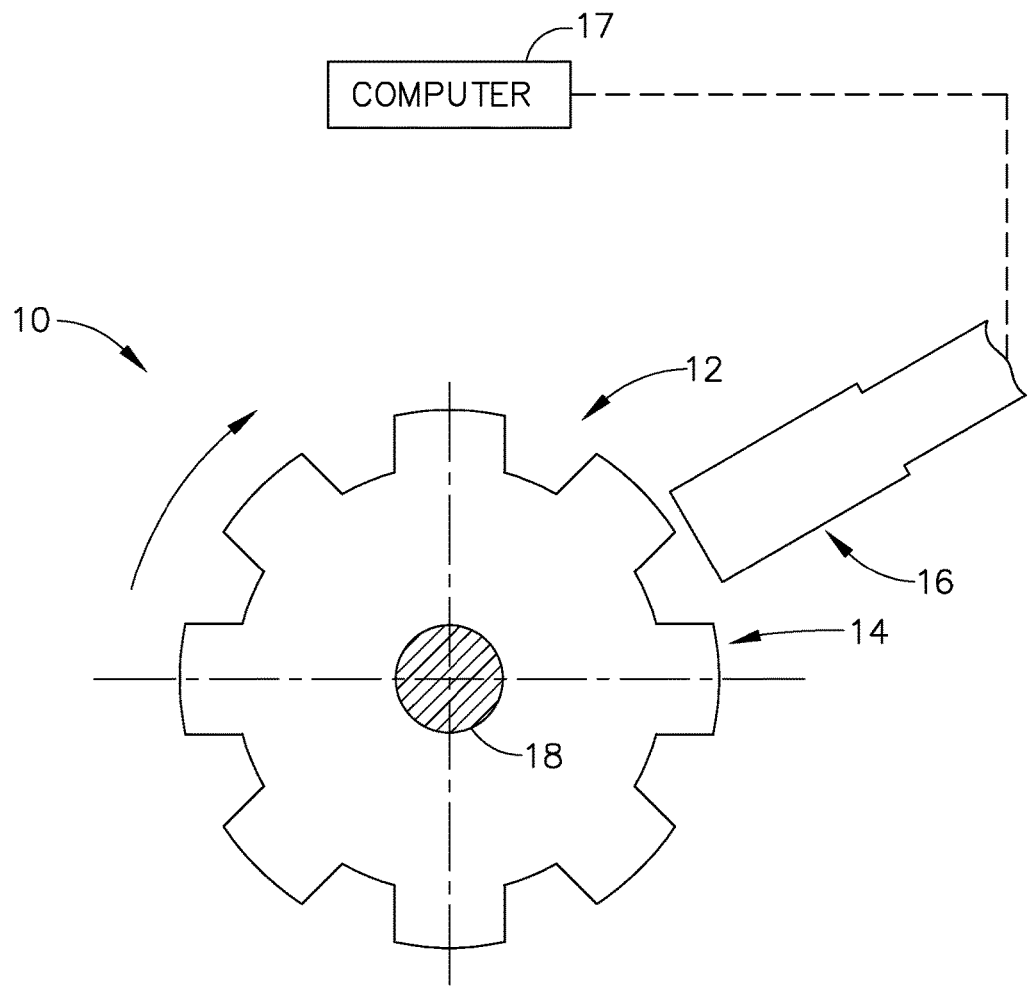
FIG. 1 is a side view of an exemplary measuring system.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus, it is intended that the present invention covers such modifications and variations as come within the scope of the appended claims and their equivalents.

Referring to FIGS. 1-10, various methods of reducing speed measurement error for a rotor are provided. Instant embodiments utilize a method which is rotor synchronous to reduce error and improve accuracy of speed measurements. By rotor synchronous, it is meant that the speed measurement is directly related to a rotation of the target. According to some examples, the method may be utilized in an engine, turbine, wheel or brake assembly, conveyor or other rotating mechanism which may benefit from the instant embodiments.

Referring initially to FIG. 1, a view of an exemplary measuring system 10 is depicted. The system includes a target 12 having a plurality of features 14 positioned thereabout. The target 12 is generally circular from which the features 14 extend. The features 14 may be teeth, projections, ribs, protuberances or other structures which may be detected. Further, embodiments may include one or more slots or other internal features as opposed to, or in addition to, the external features described above. Additionally, magnets may be embedded in the rotor. A speed sensor 16 is opposite the target 12 and produces a waveform with a frequency that is proportional to the speed of a rotor 18 which may be embodied by a shaft, for example, upon which the target 12 is mounted by detecting each of the features 14. The target 12 may be integrally formed with the rotor 18 or alternatively, may be formed separately and connected in a variety of known fashions such as a key, keyway, set screw, interference fit or other known methods of connecting such rotating structures. Additionally, the target 12 may also be physically separate from the rotor 18 while still rotating at a speed proportional to the rotor 18. For example, the target 12 may be connected to the rotor 18 through a series of gears. The speed sensor 16 may be a variable reluctance sensor, hall effect sensor, shaft encoder, proximity sensor, or photoelectric sensor, for example. For systems using magnetic sensors, the features 14 may be teeth, projections, ribs, protuberances, notches, slots, magnets, or other structures which may be detected. Further, embodiments may include one or more combinations of the above as well as slots or other internal features as opposed to external features. For systems using optical sensors, the features 14 may be alternating colors, changes in reflectivity, for example. However, other sensors and targets may be utilized and this list is not considered to be limiting. Finally, a computer 17 is shown in electrical communication, shown by broken line, to the sensor 16. The computer 17 may perform various computations and store values provided by the sensor 16, as described further herein.

Figure 2:
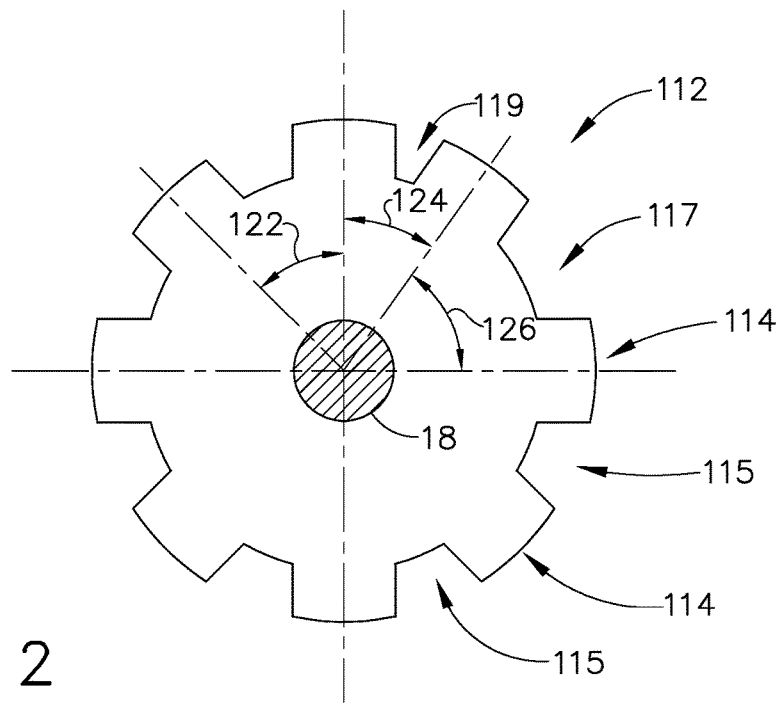
FIG. 2 is a side view of an exemplary target having at least one geometric imperfection.

Referring now to FIG. 2, a side view of a second exemplary target 112 is depicted. The target 112 includes a plurality of features 114 wherein the target 112 or at least one of the features 114 includes at least one geometric imperfection, for example tooth spacing. According to the instant embodiment, each of the features 114 includes an arcuate spacing 115 between features. This normal spacing 115 represents an angular distance and may be equivalent to 360 degrees divided by the number of features "N". However, the structure also comprises at least one non-symmetric spacing 117 which is greater than the normal spacing 115. Additionally, the depicted embodiment target 112 further comprises a second non-symmetric spacing 119 which is less than the normal spacing arcuate distance of spacing 115. The spacings 117 and 119 are not equal to 360 degrees divided by the number of teeth N. All of the spacings 115, 117 and 119 will, however, have an average spacing 115 when summed over one or more revolutions and divided by the number of features considered.

Figure 3:
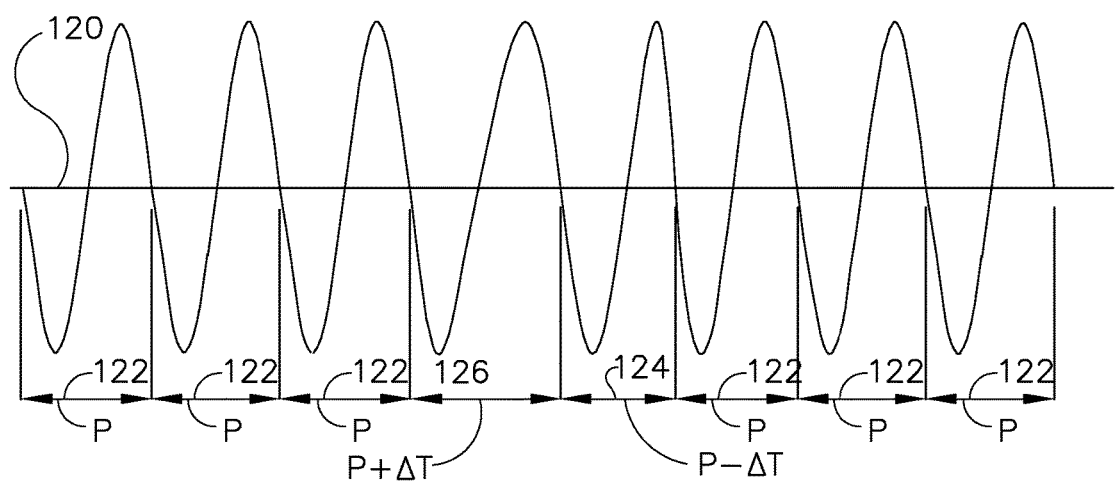
FIG. 3 is a waveform representation of the measured imperfection of the embodiment of FIG. 2 plotted on a timeline.

When the target 112 is rotating, the spacings 115, 117, 119 all correspond to periods of time 122, 126, 124 (FIG. 3). The measured arcuate spacing 115 is measured from the center of a first feature 114 to the center of an adjacent feature 114. Alternatively, the measurement may be taken from one position of a feature to an equivalent position on an adjacent feature, for example one tooth base, or from a position between features to an equivalent position between an adjacent pair of features.

Referring now to FIG. 3, a visual representation of the sensor waveform cycle associated with a rotation of target 112 is depicted and plotted on a timeline 120. The time period 122 corresponds to a single feature of target 112. The visual representation is of a waveform which is formed by analog processing of a signal created by sensor 16, for example. A plurality of periods 122 are designated along the timeline 120 corresponding to measured periods of time 122 associated with feature 114 of targets 112. Each time period, for example, may be measured between center points of features 114. Additionally, a second period 124 is noted which corresponds to the measurement of the spacing 119 which is less than the normal spacing 115 and less than the normal period 122. A third period 126 is designated and corresponds to the spacing 117 which is greater than the normal spacing 115. Subsequently, a normal period of time 122 is depicted completing the measured instance of FIG. 3 along timeline 120. Thus, where the spacing 119 is less than spacing 115, the corresponding period of time 124 will be less than the normal period of time measurement 122. Oppositely, where spacing 117 is greater than the normal spacing 115, the associated time period 126 is greater than the normal time period 122. These periods 122, 124, 126 are also depicted in FIG. 2 for purposes of representing the relationship on the target 112.

Figure 4:
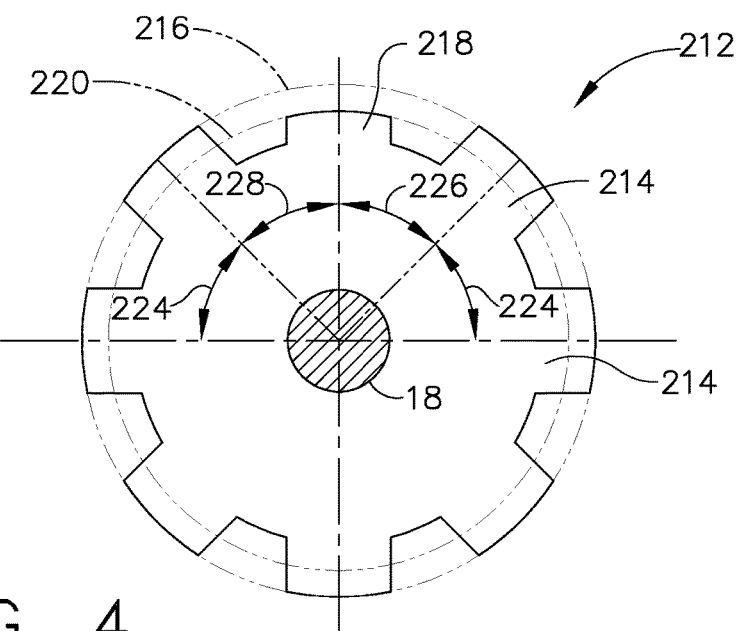
FIG. 4 is an alternative target with a geometric imperfection.

Referring now to FIG. 4, a further alternative embodiment of a target 212 is depicted. The embodiment depicts an additional asymmetric feature type, target feature height. It should be clear to one skilled in the art that any of the feature types discussed in this disclosure may be used either alone or in combination with these or other embodiments of symmetric or asymmetric features. The target 212 includes a plurality of features 214 with a first radial height 216, which is depicted by a first broken line. The target 212 further comprises a second feature 218 which is of a second radial height 220. These features 214, 218 depict a further geometric imperfection which may be utilized to determine a specific rotor position or condition, such as top dead center. Although the taller feature 214 is considered normal, it alternatively may be that the shorter feature may be the normally sized feature and the taller feature is the asymmetric feature. The low feature 218 causes a reduced amplitude in the speed waveform depicted in FIG. 5.

Figure 5:
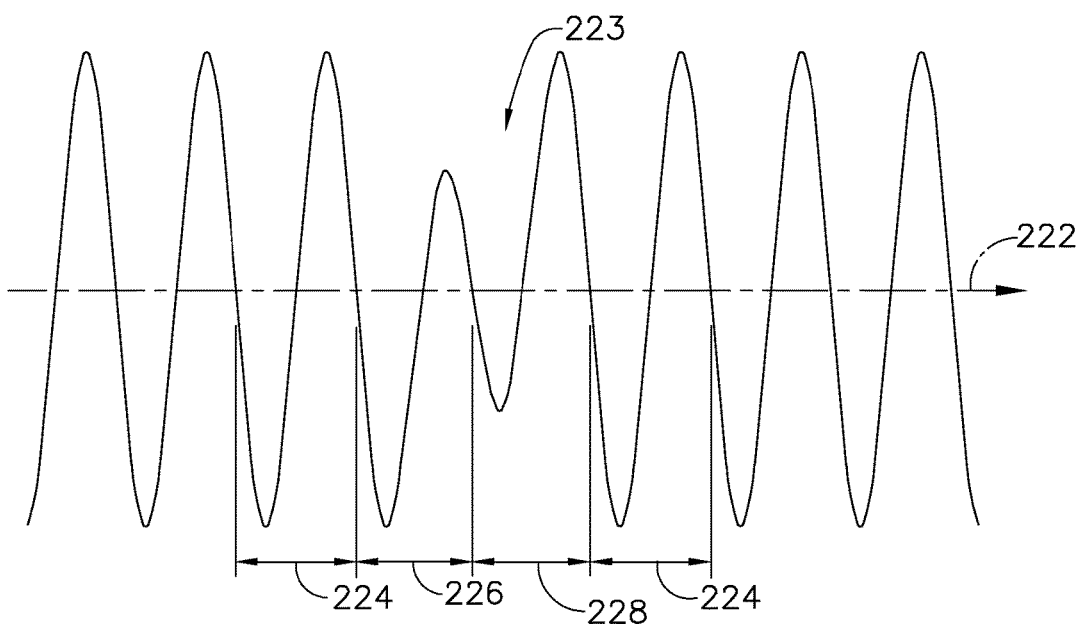
FIG. 5 is a waveform representation of the measured imperfection of the embodiment of FIG. 4 plotted on a timeline.

With reference additionally now to FIG. 5, a waveform is depicted corresponding to a rotation of the target 212 of FIG. 4. Specifically, the timeline 222 is shown with a measured pictorial representation of an exemplary waveform created by one revolution of the target 212. The periods 224 depict measured instances of time between features 214 of normal radial height 216. However, the periods 226 and 228 depict the measured instances of time between features 214 and 218 of the second radial height 220 and corresponding reduced waveform amplitude. These periods 224, 226, 228 are also shown in FIG. 4 for ease of reference. The periods 226 and 228 may be different from period 224 due to the interaction of the target and sensor, similar to how periods 124 and 126 are different than period 122 in FIG. 3. Alternatively, spacings 224, 226, 228 may be equal on timeline 222 but the measurement may interpret them as unequal spacings due to interactions between the reduced amplitude 223 and imperfections in the measurement system.

Figure 6:
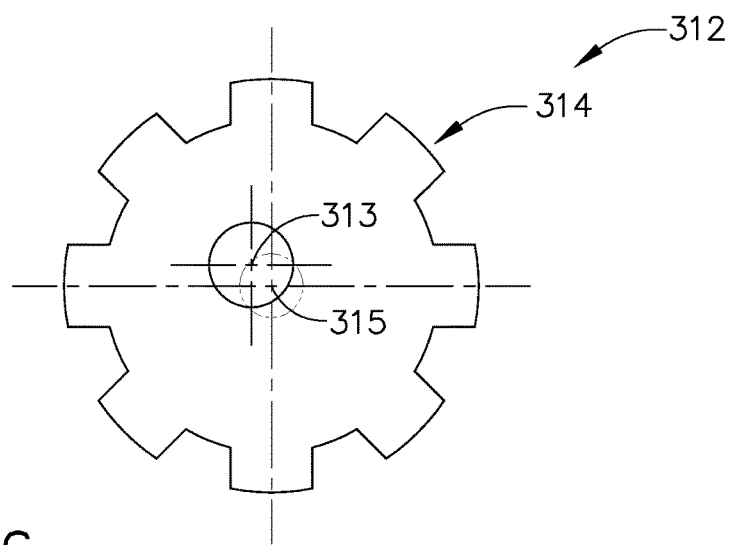
FIG. 6 is an alternative target embodiment with a geometric imperfection.
Figure 7:
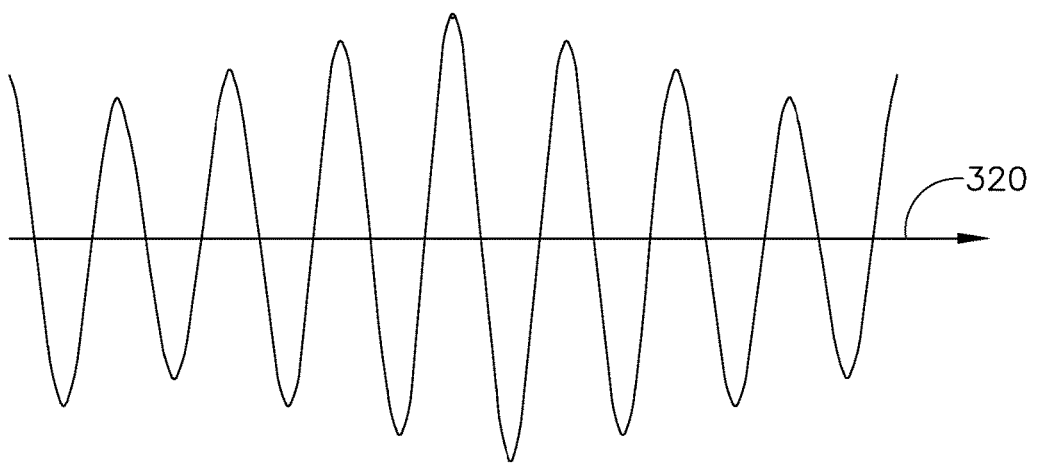
FIG. 7 is a waveform representation of the measured imperfection of the embodiment of FIG. 6 plotted on a timeline.

Referring now to FIG. 6 a further geometric imperfection is shown in target 312 including a true center 315 and an actual (asymmetric) center 313 wherein the actual center 313 of target 312 is not positioned directly in the true center 315 of target 312. The target 312 has a true center point 315 which is spaced from the actual center 313. The actual center 313 causes an off-center rotation of the target 312 and such speed waveform is depicted in FIG. 7. On the waveform and along the timeline 320, the waveform amplitude increases as the features 314 move toward the sensor and the waveform amplitude decreases as the features 314 move away from the sensor.

In summary, the rotor speed is assumed to be proportional to the period between features on the target wheel. However, error which is desired to be removed from the measurement may be introduced by imperfections in the target geometry or measurement of the features, for example, teeth on the target wheel. Such imperfections may include spacing, concentricity, variations in radial height of the features or other imperfections. Measurement system error may be caused by interactions between imperfections in the measurement system and the target geometry. Such imperfections include, but are not limited to, non-zero detection threshold which causes period measurement error if the speed waveform amplitude is not constant due to inconsistent radial height and target features or a nonconcentric target. Any combination of the target and/or measurement system imperfections shown in FIGS. 2, 4, 5, 6, and 7 may be combined in rotor and associated measurement systems. While imperfections may be necessary for various embodiments of measure, it would be desirable to eliminate the related measurement error. Additionally, it should be understood that the geometric imperfections previously described may be formed intentionally or unintentionally and the methods described herein provide a means for compensating for such imperfections in order to calculate accurate information, such as speed measurement.

Figure 8:
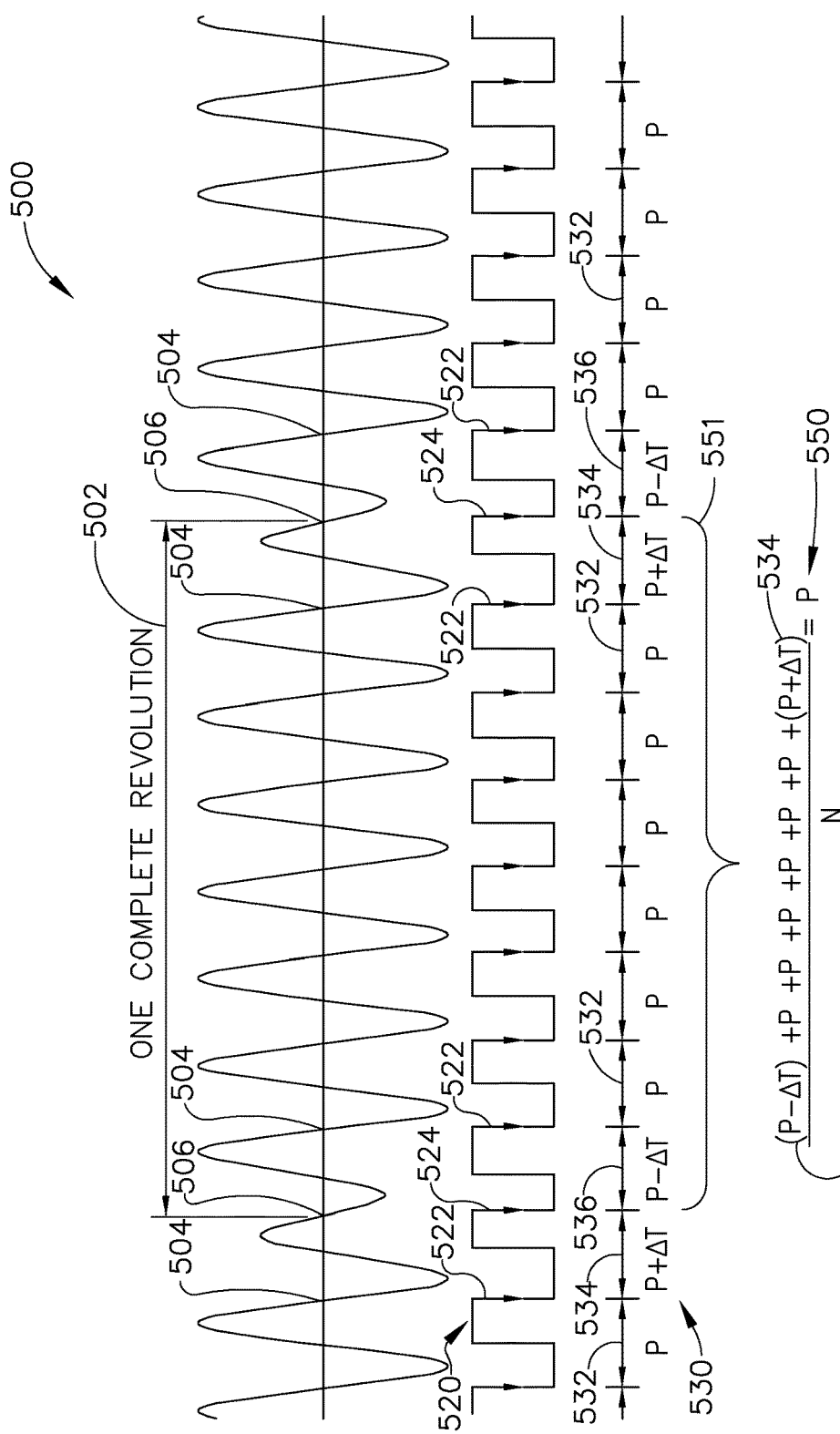
FIG. 8 is a visual relationship of an analog waveform, digital conversion and mathematic representation of a method to eliminate rotor synchronous error.

Referring now to FIG. 8, a series of signals and period measurements are depicted and related to a mathematical representation of the method of reducing rotor speed measurement. The signals and period measurements correspond to one another in the vertical direction of the figure. The analog signal represented by a waveform 500 shows a time period 502 corresponding to a single revolution of a target, for example one of the targets previously described, such as target 212 having a geometric imperfection. The analog signal waveform 500 includes a plurality of waves or signals 504 of a first wave amplitude and a first and last wave or signal 506 of a second wave amplitude representing the imperfection such as, for example, a target feature of smaller radial height.

Beneath the analog signal waveform 500 is a digital signal waveform 520. The analog waveform or signal 500 is converted to the digital signal with the use of a logic device (not shown) that has a non-zero detection threshold. By non-zero detection threshold, it is meant that the logic device will introduce error in the period measurements due to inconsistent slope of the analog signal near-zero crossings. For example, the zero crossing slope of signal 506 causes error in periods in 534, 536. The analog signal waveform 500 may have ideal zero crossing to zero crossing spacing but the logic device will produce one shorter period and one longer period in the digital waveform 520 that corresponds to the change in amplitude of the analog waveform 500. The digital signals are of equivalent shape having a first signal 522 which corresponds to the first feature signals 504. The digital waveform 520 further comprises a second digital signal 524 corresponding to wave 506 of waveform 500. As will be understood by comparing the waveforms 500, 520, the variations in waveform size correspond to the imperfections in the target wheel features.

The digital signal 520 is next converted into a period measurement 530 wherein a plurality of time periods 532 are measured and correspond to target features of normal size. However, where a target feature varies in size, shape or spacing, for example, the digital signal 524 and analog signal 500 vary from the normal or standard feature size or spacing. As depicted, the time period measurement 530 includes a longer period of time 534 which may correspond to a longer spacing between the features, for example. Adjacent to this first longer time period 534 is a shortened time period 536. In general, these may be at least one shortened and one lengthened time period measurement for each asymmetric feature.

The relationship between the individual periods of time shown in period 530 is described in equation 550. A bracket 551 is shown between the period measurement 530 and the equation 550, which depicts a group of periods corresponding to one rotation. As shown in the mathematical representation, the shortened time period 536 and the lengthened time period 534 which correspond to the geometric imperfections are accounted for in an average and the equation 550 accounts for a single rotation by utilizing a time period associated with each target feature. As previously indicated however, the number of features may be a multiple associated with the number of revolutions utilized to calculate the average. Thus, the calculation is not asynchronous wherein the average is not related to a specific rotation but instead, is synchronous with the rotation of the target. In this way, the imperfections are accounted for by averaging periods over at least one revolution of the target. While time period 502 indicates one revolution of the target as indexed from one wave 506 of reduced amplitude, the revolution of the target may be indexed to any feature on the target.

Figure 9:
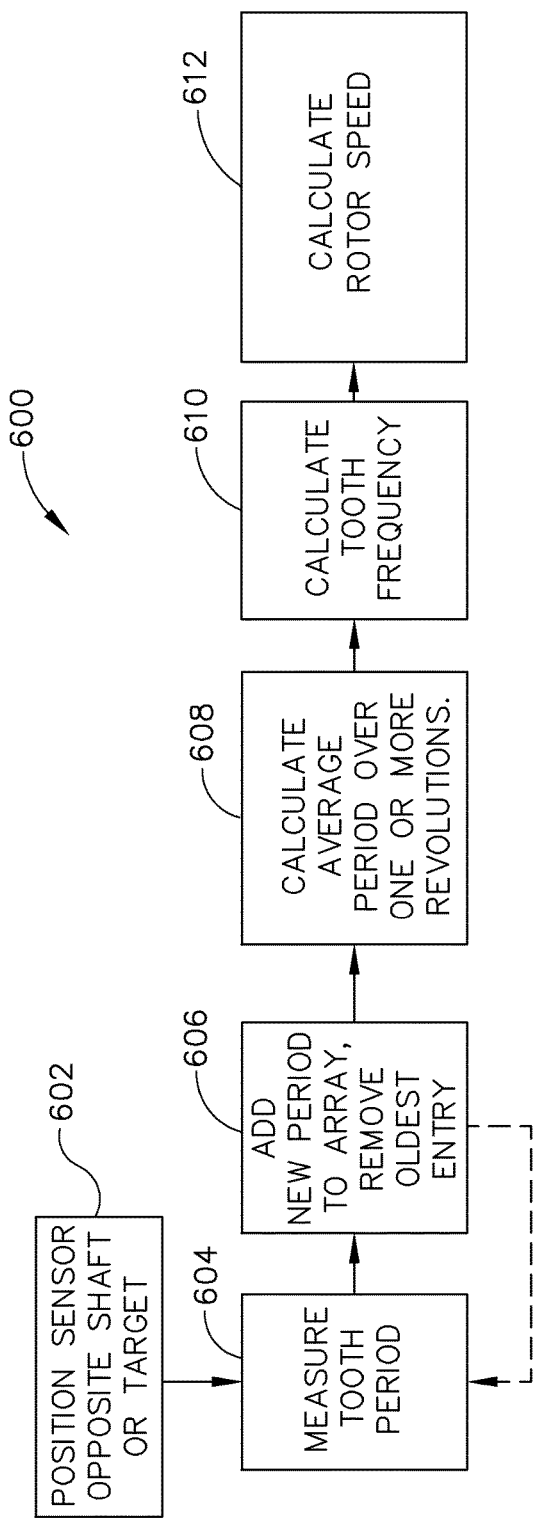
FIG. 9 is a flow chart depicting a method of reducing speed error in a synchronous manner; and, FIG. 10 is a schematic flow chart of the method of reducing or eliminating speed error in a synchronous manner.

Referring now to FIG. 9, the method 600 of calculating rotor speed is depicted in a flow chart form. According to a first step 602, a sensor is positioned opposite the target. Next, a feature period is measured at step 604. The feature period is a measure of time from a single point of one feature to a same second point at an adjacent feature. If this is the first measurement, an array is created and the period measurement is added to the array. Alternatively, the time period measurement is added to an existing array. After the period is measured at step 604, the new period measurement is added to an array at step 606. The array includes a preselected number of entries which is equal to or greater than one complete rotation or a multiple of complete rotations. When the preselected number of entries is reached, the oldest measurement period is removed from the array. Thereafter, as additional entries are made, older entries are removed from the array as indicated by broken line.

Next, at step 608, the average period measurement is calculated over one or some multiple of complete revolutions in order to account for any target synchronous errors due to target or measurement system imperfections. After this determination is made, a frequency calculation occurs at step 610 and subsequently, the average rotor speed for one or more revolutions is determined at step 612.

Figure 10:
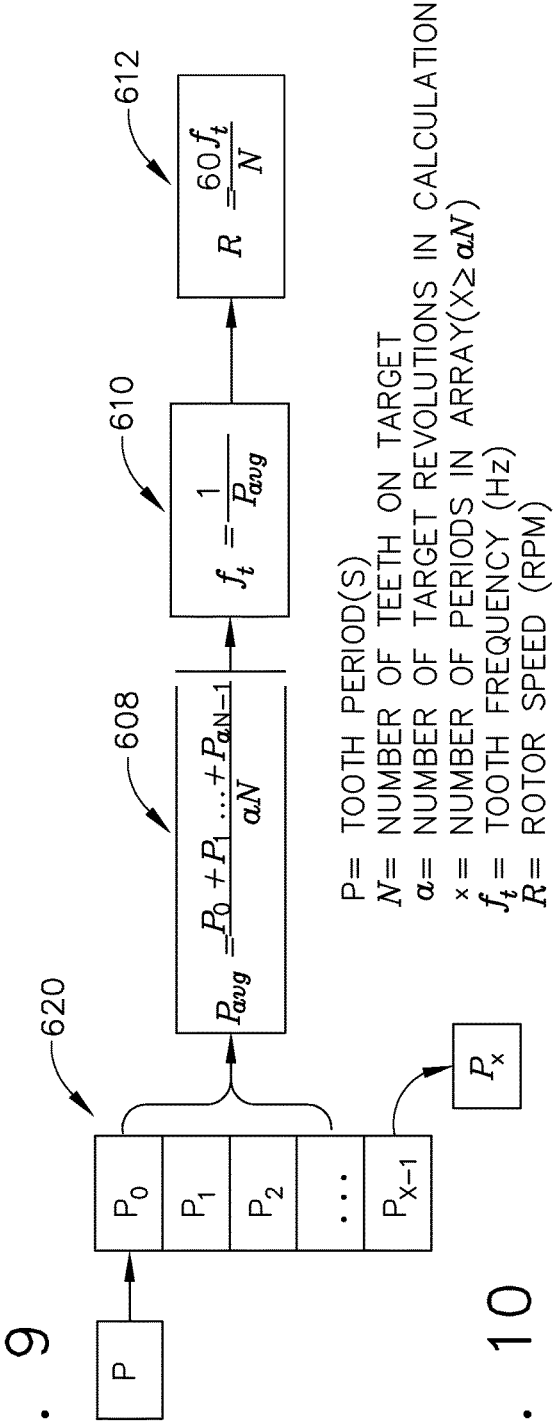

With reference now to FIG. 10, a graphical representation of the method array 600 is shown. At the left side of the figure, an array 620 is depicted. At the top of the array new entries go into the array 620 wherein $P_0$ represents the newest period measurement added to the array at step 606. Near the bottom of the array $P_x$ is shown exiting the array 620 as an additional new time period $P_0$ enters. Once this is completed, at the next step 608 an average period is calculated wherein the time periods are averaged by adding the periods corresponding to each feature in the array corresponding to one revolution or some multiple of complete revolutions and the total is divided by the number of features corresponding to the one or more complete revolutions of the target.

Following step 608, the frequency is determined at step 610 wherein an inverse of the average time period is taken to determine the frequency. Next, at step 612, the rotor speed R is determined by utilizing the frequency determined at step 610. The calculations in steps 610 and 612 of this example show the calculations necessary to produce rotor speed in RPM for a system with the target mechanically attached to the rotor. Similar calculations may be performed to produce the rotor speed in alternate units, such as hertz. Additionally, a constant may be applied to the calculated rotor speed for systems where the target is physically separate from the rotor and rotating at a speed proportional to the rotor speed.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Furthermore, references to one embodiment are not intended to be interpreted as excluding the existence of additional embodiments that may also incorporate the recited feature.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method for measuring rotor speed, comprising:
   positioning a sensor opposite a target, said target including a plurality of features, wherein at least one of said plurality of features includes at least one geometric imperfection relative to the other features of said plurality of features;
   measuring a period corresponding to time between each of said plurality of features on said target passing said sensor, the period between each pair of adjacent features of said plurality of features being measured from a first point of one of said plurality features to a same second point of an adjacent feature of said plurality of features;
establishing an array of said periods, said array including up to a preselected number of said periods;
removing old periods from said array when new periods are added and said preselected number of periods is reached;
calculating an average period from a subset of said periods in said array, said average period corresponding to one of a complete revolution or a multiple of complete revolutions; and,
calculating rotational speed of a rotor from said average period.

2. The method of claim 1, further comprising compensating for said at least one geometric imperfection by averaging said periods from one of a complete revolution or a multiple of complete revolutions of said target.

3. The method of claim 1, wherein said geometric imperfection feature causes an inconsistency in measurement of said periods.

4. The method of claim 1, wherein said at least one geometric imperfection includes inconsistent angular spacing between adjacent said features.

5. The method of claim 1, wherein said at least one geometric imperfection includes at least one of said features having inconsistent radial height.

6. The method of claim 1, wherein said at least one geometric imperfection includes said target having an asymmetric center.

7. The method of claim 1, wherein said target is integral with said rotor.

8. The method of claim 7, wherein a rotational speed of said target is equal to a rotational speed of said rotor.

9. The method of claim 1, wherein said target is connected to said rotor.

10. The method of claim 9, wherein a rotational speed of said target is proportional to said rotational speed of said rotor.

11. The method of claim 1, wherein said preselected number of said periods in said array is greater than or equal to N multiplied by a, where N is the number of said plurality of features on said target and a is the number of revolutions of said target to be considered for said average period.

12. The method of claim 11, wherein said average period comprises summing N multiplied by a number of said periods from said array then dividing by N multiplied by a.

13. The method of claim 1, further comprising continuously updating said array.

14. A method for measuring rotor speed, comprising:
positioning a sensor opposite a target, said target including a plurality of features wherein said features include at least one geometric imperfection;
measuring a period corresponding to time between each of said plurality of features on said target passing said sensor, the period between each pair of adjacent features of said plurality of features being measured from a first point of one of said plurality features to a same second point of an adjacent feature of said plurality of features;
establishing an array of said periods, said array including up to a preselected number of said periods;
removing old periods from said array when new periods are added and said preselected number of periods is reached;
calculating an average period from a subset of said periods in said array, said average period corresponding to one of a complete revolution or a multiple of complete revolutions, wherein the average period is calculated utilizing a shortened period associated with the feature having said at least one geometric imperfection and a lengthened period associated with the feature having said at least one geometric imperfection, wherein the shortened period is a shorter time period and the lengthen period is a greater time period than normal periods of said array associated with features of the plurality of features not having said at least one geometric imperfection; and
calculating rotational speed of a rotor from said average period to compensate for said at least one geometric imperfection.

15. A measurement system for measuring a rotor speed of a rotor, the system comprising:
a sensor operable to sense a target of the rotor, said target including a plurality of features, wherein at least one of said plurality of features has a geometric imperfection relative to the other features of said plurality of features; and
a controller communicatively coupled with the sensor, the controller configured to:
receive, from the sensor, a signal indicative of the rotor speed of the rotor;
determine a period corresponding to a measure of time from a single point of one feature of the plurality of features to a same second point of an adjacent feature of the plurality of features based at least in part on the received signal;
update an array having a preselected number of measured periods, wherein updating the array comprises adding the measured period to the array and removing an old measured period of the array, the old measured period being the oldest measured period of the array;
calculate an average period over one or more complete revolutions of the target based at least in part on the measured periods of the array, wherein the average period is calculated utilizing a shortened period associated with the feature having the geometric imperfection and a lengthened period associated with the feature having the geometric imperfection, wherein the shortened period is less than and the lengthen period is greater than normal periods of the measured periods of the array associated with features of the plurality of features not having the geometric imperfection;
calculate a feature frequency based at least in part on the calculated average period; and
calculate the rotor speed of the rotor based at least in part on the calculated feature frequency.

16. The measurement system of claim 15, wherein the signal received from the sensor is an analog signal, and wherein the controller is further configured to:
convert the analog signal into a digital signal, and
wherein the period is determined based at least in part on the digital signal.

17. The measurement system of claim 15, wherein the average period calculated over the one or more complete revolutions of the target based at least in part on the measured periods of the array is calculated utilizing the equation:

$$P_{AVG} = \frac{(P - \Delta T) + \sum P_{NORMAL} + (P + \Delta T)}{N},$$

wherein $P_{AVG}$ is the average period, $(P-\Delta T)$ is the shortened period associated with the feature having the geometric imperfection, $(P+\Delta T)$ is the lengthened period associated with the feature having the geometric imperfection, $\Sigma P_{NORMAL}$ is the summation of the normal periods associated with the features of the plurality of features not having the geometric imperfection, and N is a total number of the plurality of features of the target.

18. The measurement system of claim 15, wherein the average period is calculated only when one of the shortened period and the lengthened period is the old measured period of the array and the other is a new measured period of the array, the new measured period being the newest measured period of the array.

19. The measurement system of claim 15, wherein the average period is calculated over a single revolution of the target.

\* \* \* \* \*